(12) United States Patent
Wada et al.

(10) Patent No.: US 8,841,402 B2
(45) Date of Patent: Sep. 23, 2014

(54) COATING AGENT COMPOSITION AND USE THEREOF

(75) Inventors: Hiroshi Wada, Kamisu (JP); Tomeyoshi Ohori, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 613 days.

(21) Appl. No.: 12/337,286

(22) Filed: Dec. 17, 2008

(65) Prior Publication Data
US 2009/0104451 A1   Apr. 23, 2009

Related U.S. Application Data

(63) Continuation of application No. 11/777,532, filed on Jul. 13, 2007, now abandoned, which is a continuation of application No. PCT/JP2006/300386, filed on Jan. 13, 2006.

(30) Foreign Application Priority Data

Jan. 13, 2005   (JP) .................................. 2005-006196

(51) Int. Cl.
*C08G 18/12*   (2006.01)
*C08G 18/22*   (2006.01)
*C08G 18/48*   (2006.01)
*C08G 18/73*   (2006.01)
*C08G 18/75*   (2006.01)

(52) U.S. Cl.
USPC ................... 528/55; 528/59; 528/60; 528/61; 528/64; 528/65; 528/67; 528/76; 528/77

(58) Field of Classification Search
USPC ............ 528/55, 59, 67, 76, 77, 60, 61, 64, 65
See application file for complete search history.

(56) References Cited

U.S. PATENT DOCUMENTS

| | | | |
|---|---|---|---|
| 4,945,149 A | 7/1990 | Matsumoto et al. | |
| 4,957,959 A * | 9/1990 | Matsumoto et al. | 524/196 |
| 5,049,638 A | 9/1991 | Matsumoto et al. | |
| 5,075,408 A | 12/1991 | Suzuki et al. | |
| 5,238,732 A | 8/1993 | Krishnan | |
| 5,239,036 A | 8/1993 | Krishnan | |
| 5,239,037 A | 8/1993 | Krishnan | |
| 5,698,656 A * | 12/1997 | Ohashi et al. | 528/49 |
| 5,869,593 A * | 2/1999 | Helmeke et al. | 528/83 |
| 6,057,416 A | 5/2000 | Nodelman et al. | |
| 6,720,401 B2 | 4/2004 | Toyofuku et al. | |
| 2002/0013426 A1 | 1/2002 | Toyofuku et al. | |
| 2004/0147626 A1 | 7/2004 | Hohl et al. | |
| 2004/0229996 A1 | 11/2004 | Gansen et al. | |

FOREIGN PATENT DOCUMENTS

| | | |
|---|---|---|
| EP | 0 339 435 A1 | 11/1989 |
| JP | 62-57467 | 3/1987 |
| JP | 64-62320 | 3/1989 |
| JP | 2-28210 | 1/1990 |
| JP | 3-229773 | 10/1991 |
| JP | 4-272917 | 9/1992 |
| JP | 8-253547 | 10/1996 |
| JP | 11-222513 | 8/1999 |
| JP | 11-228653 | 8/1999 |
| JP | 2000-220076 | 8/2000 |
| JP | 2002-69370 | 3/2002 |
| JP | 2004-231962 | 8/2004 |
| JP | 2004-300178 | 10/2004 |
| JP | 2004-346127 | 12/2004 |

OTHER PUBLICATIONS

Notification of Reasons for issued Jan. 24, 2012 in Japanese Patent Application No. 2006-552991 (with English translation).
Extended European Search Report issued Mar. 4, 2013 in Patent Application No. 06711671.5.

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

The invention relates to a coating agent composition comprising an isocyanate-group-containing prepolymer obtained by reacting a polyol comprising a polyoxyalkylene polyol having 2-4 hydroxyl groups on average, an oxyethylene group content of 85-100% by mass based on all oxyalkylene groups (100% by mass), and an arithmetic-average molecular weight of 800-2,500 with an alicyclic isocyanate and/or an aliphatic isocyanate in the presence of an organic acid bismuth salt catalyst, the isocyanate(s) being used in such an amount as to result in an isocyanate index of 150-300. The invention can provide a coating agent composition which forms a coating film or film having moisture permeability, excellent in mechanical properties and yellowing resistance, having laundering durability and resistance to sweat deterioration, and containing no organotin compounds.

20 Claims, No Drawings

US 8,841,402 B2

COATING AGENT COMPOSITION AND USE THEREOF

CROSS-REFERENCE TO RELATED APPLICATION

This application is a continuation of U.S. application Ser. No. 11/777,532, filed on Jul. 13, 2007, now abandoned, which is a continuation of PCT/JP06/300386, filed on Jan. 13, 2006, and claims priority to Japanese Patent Application No. 2005-006196, filed on Jan. 13, 2005.

TECHNICAL FIELD

The present invention relates to a coating agent composition, an article having a coating film obtained from the coating agent composition, and a film obtained from the coating agent composition.

BACKGROUND ART

A moisture-permeable material which comprises a porous base, e.g., a fabric, having a substantially non-porous layer of a hydrophilic polyurethane resin on a surface thereof and which is suitable for use as a material for garments, etc. is known. The layer of a hydrophilic polyurethane resin absorbs moisture from the high-humidity side and releases moisture to the low-humidity side. The layer thus functions to transmit moisture.

The main raw materials for the layer of a hydrophilic polyurethane resin comprise a polyol having high hydrophilicity and an isocyanate compound. In many cases, a two-pack type coating agent composition comprising a combination of an isocyanate-group-containing prepolymer obtained by reacting a polyol having high hydrophilicity with an isocyanate compound and a curing agent is used for forming the layer of a hydrophilic polyurethane resin.

Proposed as such coating agent compositions are: a coating agent composition forming a coating film or film which retains the flexibility and elongation of hydrophilic polyurethane resins in at least some degree and has high mechanical strength (patent document 1); a coating agent composition forming a coating film or film which has high elongation and high moisture permeability (patent document 2); and a coating agent composition which is satisfactory in mechanical properties such as tensile strength and abrasion properties, does not swell in water, and has satisfactory laundering durability (patented document 3).

However, the coating films obtained from the related-art coating agent compositions have a problem that they change in color to yellow by the action of sunlight or $NO_x$ because an aromatic polyisocyanate was used as a raw-material isocyanate compound for the isocyanate-group-containing prepolymer, that is, the coating films have poor yellowing resistance (light resistance and $NO_x$ resistance).

It is known that the yellowing resistance of a coating film to be obtained is improved by using an aliphatic polyisocyanate in place of the aromatic polyisocyanate.

However, since an aliphatic polyisocyanate brings about a low cohesive force, it is difficult to obtain a coating film which retains laundering durability and resistance to sweat deterioration. Resistance to sweat deterioration means resistance to the higher fatty acids, in particular oleic acid, which are a component of human sweat. In garment applications, coating films are desired to suffer neither swelling in nor deterioration by oleic acid and to have sufficient laundering durability. So far, an aromatic polyisocyanate has had to be used as a raw material for the isocyanate-group-containing prepolymer.

On the other hand, in the case where a catalyst is necessary for the reaction of a polyol with an isocyanate compound, an organotin compound (e.g., dibutyltin dilaurate) is used. In recent years, however, use of organotin compounds tends to be avoided because of growing concerns about environmental issues. Consequently, nonuse of an organotin compound is desired.

Patent Document 1: JP-A-62-57467
Patent Document 2: JP-A-3-229773
Patent Document 3: JP-A-2002-69370

DISCLOSURE OF THE INVENTION

Problems that the Invention is to Solve

The invention provides a coating agent composition for forming a substantially non-porous polyurethane resin coating film or film which has moisture permeability, is excellent in mechanical properties such as tensile strength, elongation, and abrasion resistance, has a low degree of swelling with water, has laundering durability, and has such sweat deterioration resistance that it neither swells nor deteriorates with sweat components, and which retains excellent yellowing resistance over a long period even when exposed to sunlight or $NO_x$ and contains no organotin compounds.

Means for Solving the Problems

The coating agent composition of the invention comprises an isocyanate-group-containing prepolymer obtained by reacting a polyol comprising a polyoxyalkylene polyol having 2-4 hydroxyl groups on average, an oxyethylene group content of 85-100% by mass based on all oxyalkylene groups (100% by mass), and an arithmetic-average molecular weight of 800-2,500 with an isocyanate compound comprising an alicyclic isocyanate and/or an aliphatic isocyanate in the presence of an organic acid bismuth salt catalyst, the isocyanate compound being used in such an amount as to result in an isocyanate index of 150-300.

The polyoxyalkylene polyol preferably is a polyoxyethylene polyol having 2-4 hydroxyl groups on average and/or a polyoxyethylene-polyoxypropylene polyol having 2-4 hydroxyl groups on average.

The isocyanate compound preferably is isophorone diisocyanate.

The organic acid bismuth salt catalyst preferably is a bismuth salt of an aliphatic carboxylic acid having 6-20 carbon atoms.

It is preferred that the amount of the organic acid bismuth salt catalyst be 5-100 ppm relative to the total amount of all polyols and the isocyanate compound.

The invention further provides an article having a coating film obtained from the coating agent composition of the invention.

The invention furthermore provides a film obtained from the coating agent composition of the invention.

Advantages of the Invention

According to the coating agent composition of the invention, a coating film or film is obtained which is excellent in mechanical properties such as tensile strength, elongation, and abrasion resistance while retaining sufficient moisture permeability, has a low degree of swelling with water, has laundering durability, and has such sweat deterioration resistance that it neither swells nor deteriorates with sweat components, and which retains excellent yellowing resistance over a long period even when exposed to sunlight or $NO_x$ and contains no organotin compounds.

Furthermore, the article having a coating film obtained from the coating agent composition of the invention has advantages that the coating film is excellent in mechanical properties and yellowing resistance while retaining sufficient moisture permeability, has laundering durability and resistance to sweat deterioration, and contains no organotin compounds.

Moreover, the film of the invention is excellent in mechanical properties and yellowing resistance while retaining sufficient moisture permeability, has laundering durability and resistance to sweat deterioration, and contains no organotin compounds.

BEST MODE FOR CARRYING OUT THE INVENTION

Coating Agent Composition

The coating agent composition of the invention comprises an isocyanate-group-containing prepolymer obtained by reacting a polyol comprising a polyoxyalkylene polyol with an isocyanate compound in the presence of a urethane formation catalyst. It is a coating agent composition for forming a hydrophilic polyurethane resin coating film or film which has moisture permeability and is substantially non-porous.

(Polyoxyalkylene Polyol)

The polyoxyalkylene polyol to be used in the invention preferably is one obtained by the ring-opening addition polymerization of an alkylene oxide in the presence of a ring-opening addition polymerization catalyst and an initiator.

The initiator preferably is a compound which has functional groups capable of adding alkylene oxides, such as hydroxyl, amino, imino, and carboxyl groups, and in which the functional groups have 2-8, especially 2-4 active hydrogen atoms. Examples of the initiator include polyhydric alcohols, alkanolamines, and polyamines. Specific examples thereof include polyhydric alcohols such as ethylene glycol, propylene glycol, glycerol, trimethylolpropane, 1,2,6-hexanetriol, pentaerythritol, diglycerol, dextrose, and sucrose; alkanolamines such as monoethanolamine, diethanolamine, and triethanolamine; polyamines such as ethylenediamine and propylenediamine; and alkylene oxide adducts of these. Preferred initiators are di- to tetrahydric alcohols. Especially preferred are ethylene glycol, propylene glycol, glycerol, pentaerythritol, and trimethylolpropane. One initiator may be used alone, or two or more initiators may be used in combination.

Examples of the alkylene oxides include ethylene oxide, propylene oxide, 1,2-butylene oxide, and 2,3-butylene oxide. It is especially preferred to use ethylene oxide alone or a combination of ethylene oxide and propylene oxide as the alkylene oxide(s).

Examples of the ring-opening addition polymerization catalyst include alkali metal compound catalysts and composite metal cyanide complex catalysts.

The polyoxyalkylene polyol may be one which comprises an initiator and ethylene oxide, propylene oxide, etc. bonded thereto in block arrangement by ring-opening addition polymerization or bonded thereto in random arrangement by ring-opening addition polymerization, or may be one comprising the two.

The polyoxyalkylene polyol preferably is a polyoxyethylene polyol or a polyoxyethylene-polyoxypropylene polyol or a mixture of these.

The oxyethylene group content of the polyoxyalkylene polyol is 85-100% by mass based on all oxyalkylene groups (100% by mass). The term "oxyalkylene groups" means the groups formed by the ring-opening addition polymerization of an alkylene oxide. In the case where an alkylene oxide adduct of a polyhydric alcohol or the like was used as an initiator to polymerize an alkylene oxide by ring-opening addition polymerization, the oxyalkylene groups in the initiator are also included. By regulating the oxyethylene group content thereof to 85% by mass or higher, a coating film having sufficient moisture permeability is obtained. Furthermore, the use of a polyoxyalkylene polyol having an oxyethylene group content of 85% by mass or higher in combination with an isocyanate compound comprising an alicyclic isocyanate and/or an aliphatic isocyanate enables the coating film to be equal in laundering durability and resistance to sweat deterioration to the coating films obtained from related-art coating agent compositions prepared using an aromatic isocyanate as a raw-material isocyanate compound.

The arithmetic-average molecular weight of the polyoxyalkylene polyol is 800-2,500. One polyoxyalkylene polyol alone or a mixture of two or more polyoxyalkylene polyols may be used. In the case where one polyoxyalkylene polyol is used as the only polyoxyalkylene polyol, the term "arithmetic-average molecular weight" in the invention means the hydroxyl-value-converted molecular weight itself calculated using the following equation from a hydroxyl value determined in accordance with JIS K 1557. In the case of a mixture, the arithmetic-average molecular weight thereof is calculated from the hydroxyl-value-converted molecular weights of the respective polyoxyalkylene polyols calculated using the following equation and from the molar fractions thereof.

Hydroxyl-value-converted molecular weight=56,100× (number of active hydrogen atoms in initiator used in producing the polyoxyalkylene polyol)/ (hydroxyl value)

By regulating the polyoxyalkylene polyol so as to have an arithmetic-average molecular weight of 800 or higher, a coating film is obtained which has sufficient moisture permeability and gives a soft feeling without having an increased modulus. By regulating the polyoxyalkylene polyol so as to have an arithmetic-average molecular weight of 2,500 or lower, a coating film is obtained which has a reduced degree of swelling with water to thereby has satisfactory laundering durability and which is reduced in the property of swelling with oleic acid and thereby has satisfactory resistance to sweat deterioration.

In the case where a mixture of polyoxyalkylene polyols is used, the hydroxyl-value-converted molecular weight of each polyoxyalkylene polyol is preferably 500-5,000, especially preferably 800-4,000.

The polyoxyalkylene polyol has 2-4, preferably 2.3-3 hydroxyl groups on average. By regulating the polyoxyalkylene polyol so as to have two or more hydroxyl groups on average, a coating film is obtained which has sufficient properties concerning mechanical properties, resistance to sweat deterioration, and laundering durability. By regulating the polyoxyalkylene polyol so as to have four or less hydroxyl groups on average, a coating film is obtained which has sufficient moisture permeability and gives a soft feeling without having an increased modulus. Furthermore, even when a curing agent is used, the composition containing this polyoxyalkylene polyol shows reduced reactivity, is less apt to foam, and gives a satisfactory coating film. Incidentally, the number of hydroxyl groups in each polyoxyalkylene polyol is equal to the number of active hydrogen atoms in the initiator used in producing the polyoxyalkylene polyol.

In the case where a mixture of polyoxyalkylene polyols is used, this mixture preferably is a mixture of from 20% by mole to less than 100% by mole polyoxyalkylene polyol having 2-4 (more preferably 2-3) hydroxyl groups and a hydroxyl-value-converted molecular weight of from 500 to less than 2,000 and from more than 0% by mole to 80% by mole polyoxyalkylene polyol having 2-4 (more preferably 2-3) hydroxyl groups and a hydroxyl-value-converted molecular weight of from 2,000 to 5,000. Especially preferred is a mixture of 50-90% by mole the former and 10-50% by mole the latter. It is also preferred that at least either has three hydroxyl groups.

Also preferred is a mixture of a polyoxyalkylene polyol having two hydroxyl groups and a hydroxyl-value-converted molecular weight of 800-2,500 and a polyoxyalkylene polyol having three hydroxyl groups and a hydroxyl-value-converted molecular weight of 800-2,500. In this case, a mixture of from more than 0% by mole to 80% by mole the former and from 20% by mole to less than 100% by mole the latter is preferred.

Polyols other than polyoxyalkylene polyols may also be used in the invention. Examples of the other polyols include polyhydric alcohols. Examples of the polyhydric alcohols include dihydric alcohols such as ethylene glycol, diethylene glycol, propylene glycol, dipropylene glycol, 1,4-butanediol, neopentyl glycol, 1,5-pentanediol, 3-methyl-1,5-pentanediol, and 1,6-hexanediol.

In the invention, the proportion of the polyoxyalkylene polyol in all polyols (100% by mass) is preferably 80% by mass or higher, more preferably 90% by mass or higher, especially preferably substantially 100% by mass.

(Isocyanate Compound)

The isocyanate compound in the invention comprises an alicyclic isocyanate and/or an aliphatic isocyanate. By using an alicyclic isocyanate and/or an aliphatic isocyanate, a coating film having excellent yellowing resistance is obtained.

Examples of the alicyclic isocyanate include isophorone diisocyanate, 4,4'-dicyclohexylmethane diisocyanate, 2,5-norbornane diisocyanate, 2,6-norbornane diisocyanate, and a mixture of 2,5-norbornane diisocyanate and 2,6-norbornane diisocyanate.

Examples of the aliphatic isocyanate include 1,6-hexamethylene diisocyanate, 2,2,4-trimethylhexamethylene diisocyanate, lysine diisocyanate, and lysine triisocyanate.

The isocyanate compound preferably is an alicyclic isocyanate because this isocyanate is excellent in yellowing resistance, mechanical properties, and laundering durability and is inexpensive. Isophorone diisocyanate is especially preferred.

(Urethane Formation Catalyst)

As the urethane formation catalyst is used an organic acid bismuth salt catalyst, which less exerts an influence on the environment. An organic acid bismuth salt catalyst is preferred also because it accelerates urethane formation reactions even when used in a relatively small amount and imparts stable reactivity.

Examples of the organic acid bismuth salt catalyst include bismuth salts of aliphatic carboxylic acids having 6-20 carbon atoms and bismuth salts of resin acids having 6-20 carbon atoms. Examples of the resin acid bismuth salts include bismuth salts of alicyclic carboxylic acids having 6-20 carbon atoms, such as abietic acid, neoabietic acid, d-pimaric acid, iso-d-pimaric acid, and podocarpic acid; and bismuth salts of aromatic carboxylic acids having carbon atoms, such as benzoic acid, cinnamic acid, and p-hydroxycinnamic acid. Examples of the bismuth salts of aliphatic carboxylic acids having 6-20 carbon atoms include the bismuth salts of aliphatic monocarboxylic acids having carbon atoms, such as octylic acid, neodecanoic acid, and neododecanoic acid. The organic acid bismuth salt catalyst preferably is a bismuth salt of an aliphatic carboxylic acid having 6-20 carbon atoms because this salt has high reactivity and a small temperature dependence. The bismuth salt of octylic acid is especially preferred.

The amount of the organic acid bismuth salt catalyst to be added is preferably 5-100 ppm, especially preferably 10-50 ppm, relative to the total amount of all polyols and the isocyanate compound. By regulating the addition amount of the organic acid bismuth salt catalyst to 5 ppm or larger, the urethane formation reaction is sufficiently accelerated. By regulating the addition amount of the organic acid bismuth salt catalyst to 100 ppm or smaller, excessive urethane formation reaction is inhibited to facilitate the control of reaction temperature.

(Isocyanate-Group-Containing Prepolymer)

The isocyanate-group-containing prepolymer is one obtained by reacting a polyol comprising the polyoxyalkylene polyol with the isocyanate compound in the presence of a urethane formation catalyst. The reaction temperature is preferably 40-150° C.

The polyols comprising the polyoxyalkylene polyol and the isocyanate compound are used in such a proportion as to result in an isocyanate index of 150-300, preferably 160-290. By regulating the isocyanate index to 150 or higher, a coating film having sufficient resistance to sweat deterioration and sufficient laundering durability is obtained. By regulating the isocyanate index to 300 or lower, a coating film is obtained which has sufficient moisture permeability and gives a soft feeling without having an increased modulus. Isocyanate index is a value which is 100 times the proportion of the equivalent amount of isocyanate group of the isocyanate compound to the equivalent amount of hydroxyl group of all polyols.

(Curing Agent)

A curing agent may be used in order to cure the isocyanate-group-containing prepolymer. Namely, the coating agent composition of the invention may be a two-ingredient system composed of a main ingredient comprising the isocyanate-group-containing prepolymer and a curing agent ingredient.

Examples of the curing agent include compounds having two or more active-hydrogen-containing functional groups. Preferred are polyols, alkanolamines, and polyamines each having a relatively low molecular weight. Especially preferred is a diol or diamine having a molecular weight of 400 or lower. The molecular weight of the diol or diamine is more preferably 300 or lower, especially preferably 200 or lower.

Examples of the curing agent include dihydric alcohols such as ethylene glycol, diethylene glycol, propylene glycol, dipropylene glycol, 1,4-butanediol, neopentyl glycol, 1,5-pentanediol, 3-methyl-1,5-pentanediol, and 1,6-hexanediol; and polyamines such as ethylenediamine, 1,2-propylenediamine, 1,3-propylenediamine, 1,4-tetramethylenediamine, 1,6-hexamethylenediamine, isophoronediamine, 4,4'-cyclohexanediamine, and N-methyldiethanolamine.

The curing agent is used preferably in such an amount that the amount of the active-hydrogen-containing functional groups of the curing agent is 0.6-1.6 mol per mol of the isocyanate groups of the isocyanate-group-containing prepolymer, especially preferably in such an amount that the amount of the active-hydrogen-containing functional groups of the curing agent is 0.8-1.4 mol.

The coating agent composition of the invention may be cured with the moisture in air, polyamine vapor, etc. in place of a curing agent. In the case where the composition is cured with the moisture in air, an amine catalyst (e.g., triethylamine, triethylenediamine, or 2,2'-dimorpholinodiethyl ether) may be used according to need in order to accelerate the reaction.
(Other Additives)

Ingredients such as an antioxidant, light stabilizer, ultraviolet absorber, flame retardant, filler, colorant, and plasticizer may be incorporated into the coating agent composition of the invention according to need.
<Uses>

The article of the invention is one which has a coating film obtained from the coating agent composition of the invention. Specifically, it may be an article having a coating film formed by applying the coating agent composition of the invention to a porous base, e.g., a fabric, and curing the composition. Examples of the article of the invention include sports garments, tents, and industrial materials each having moisture permeability.

The film of the invention is one obtained from the coating agent composition of the invention. Specifically, it may be a film obtained by applying the coating agent composition of the invention to a releasing substrate, curing the composition to form a coating film, and stripping the coating film from the releasing substrate.

In the case where the coating film or film obtained is to be used as a water-impermeable and moisture-permeable material, it preferably is substantially non-porous. Consequently, it is preferred that a curing method for forming a porous film, e.g., the wet coagulation method, should not be employed.

The coating film or film obtained may be in the form of a foam having cells. Namely, it may be a coating film or film in the form of a foam which is substantially air-impermeable. It is, however, preferred that the coating film or film obtained from the coating agent composition of the invention be a coating film or film which is substantially non-cellular, i.e., substantially solid.
<Effects>

The coating agent composition of the invention comprises an isocyanate-group-containing prepolymer obtained using an alicyclic isocyanate and/or an aliphatic isocyanate as an isocyanate compound. Because of this, it is superior in the yellowing resistance of coating films to the related-art coating agent compositions comprising an isocyanate-group-containing prepolymer obtained using an aromatic isocyanate.

In general, there is a tendency that when an alicyclic isocyanate and/or an aliphatic isocyanate is used in place of an aromatic isocyanate, the coating film obtained has reduced laundering durability and reduced resistance to sweat deterioration. However, the coating agent composition of the invention gives a coating film retaining sufficient laundering durability and sufficient resistance to sweat deterioration, because it comprises an isocyanate-group-containing prepolymer obtained using a polyol comprising a polyoxyalkylene polyol having 2-4 hydroxyl groups on average, an oxyethylene group content of 85-100% by mass based on all oxyalkylene groups (100% by mass), and an arithmetic-average molecular weight of 800-2,500.

Furthermore, when an aromatic isocyanate is used as an isocyanate compound and a polyoxyalkylene polyol having an oxyethylene group content of 85% by mass or higher is used as a polyol, then the isocyanate-group-containing prepolymer obtained generally has an increased viscosity and, hence, the resultant coating agent composition may solidify or be difficult to apply. The coating film obtained therefrom has reduced mechanical properties and reduced permeability (see, for example, the Comparative Examples 2 and 3 in patent document 1). In the coating agent composition of the invention, the isocyanate-group-containing prepolymer obtained is inhibited from having an increased viscosity because an alicyclic isocyanate and/or an aliphatic isocyanate was used as an isocyanate compound. The coating film obtained from this coating agent composition, which comprises the isocyanate-group-containing prepolymer obtained from a polyol comprising a polyoxyalkylene polyol having an oxyethylene group content of 85% by mass or higher and an alicyclic isocyanate and/or aliphatic isocyanate, has moisture permeability and excellent mechanical properties.

Because the coating agent composition of the invention comprises the isocyanate-group-containing prepolymer obtained by reacting the polyols with the isocyanate compound in the presence of an organic acid bismuth salt catalyst, a coating film or film which contains no organotin compounds is obtained therefrom. This coating film or film less influences the environment.

EXAMPLES

The invention will be explained below in more detail by reference to Examples, but the invention should not be construed as being limited by the following Examples. In the Examples and Comparative Examples, "parts" means "parts by mass".
(Isocyanate Compounds)

IPDI: Isophorone diisocyanate (Desmodur I, manufactured by Sumika Bayer Urethane Co., Ltd.).

MDI: 4,4'-Diphenylmethane diisocyanate (Millionate MT, manufactured by Nippon Polyurethane Industry Co., Ltd.).
(Polyols)

T-1000-100: A polyoxyalkylene triol obtained by the ring-opening addition polymerization of ethylene oxide using a potassium hydroxide catalyst in the presence of glycerol as an initiator, the polyoxyalkylene triol having a hydroxyl value of 166 mg-KOH/g (hydroxyl-value-converted molecular weight, 1,014), three hydroxyl groups, and an oxyethylene group content of 100% by mass based on all oxyalkylene groups.

T-3500-80: A polyoxyalkylene triol obtained by the ring-opening addition polymerization of a mixture of ethylene oxide and propylene oxide (mass ratio, 80:20) using a potassium hydroxide catalyst in the presence of glycerol as an initiator, the polyoxyalkylene triol having a hydroxyl value of 47.0 mg-KOH/g (hydroxyl-value-converted molecular weight, 3,581), three hydroxyl groups, and an oxyethylene group content of 80% by mass based on all oxyalkylene groups.

D-2000-80: A polyoxyalkylene diol obtained by the ring-opening addition polymerization of a mixture of ethylene oxide and propylene oxide (mass ratio, 80:20) using a potassium hydroxide catalyst in the presence of propylene glycol as an initiator, the polyoxyalkylene diol having a hydroxyl value of 56.3 mg-KOH/g (hydroxyl-value-converted molecular weight, 1,993), two hydroxyl groups, and an oxyethylene group content of 80% by mass based on all oxyalkylene groups.

D-1000-100: PEG #1000U, manufactured by NOF Corporation; a polyoxyalkylene diol having a hydroxyl value of 113 mg-KOH/g (hydroxyl-value-converted molecular weight, 993), two hydroxyl groups, and an oxyethylene group content of 100% by mass based on all oxyalkylene groups.

Synthesis of Isocyanate-Group-Containing Prepolymer

Example 1

Into a 1-L separable flask equipped with a thermometer and a stirrer were introduced 306.4 parts of T-1000-100, 321.3 parts of T-3500-80, 372.3 parts of IPDI (isocyanate index=285), and 0.03 parts (30 ppm) of bismuth octylate (trade name, Nikka Octics Bismuth 25%; manufactured by Nihon Kagaku Sangyo Co., Ltd.). The contents were reacted at 75-85° C. for 2 hours in a dry nitrogen stream to obtain an isocyanate-group-containing prepolymer.

Example 2

An isocyanate-group-containing prepolymer was obtained in the same manner as in Example 1, except that the mixing ratio of T-1000-100 and T-3500-80 and the isocyanate index were changed to the values shown in Table 1.

Example 3

An isocyanate-group-containing prepolymer was obtained in the same manner as in Example 1, except that the mixing ratio of T-1000-100 and T-3500-80 and the isocyanate index were changed to the values shown in Table 1.

Example 4

An isocyanate-group-containing prepolymer was obtained in the same manner as in Example 1, except that T-1000-100 was used as the only polyol in the amount shown in Table 1 and the isocyanate index was changed to the value shown in Table 1.

Example 5

An isocyanate-group-containing prepolymer was obtained in the same manner as in Example 1, except that T-1000-100 and D-1000-100 were used as polyols in the amounts shown in Table 1 (the mixture had 2.3 hydroxyl groups on average) and the isocyanate index was changed to the value shown in Table 1.

Comparative Example 1

An isocyanate-group-containing prepolymer was obtained in the same manner as in Example 1, except that IPDI was replaced with MDI and that the mixing ratio of the polyols was changed as shown in Table 2 so that the arithmetic-average molecular weight of the polyols became 1,500.

Comparative Example 2

An isocyanate-group-containing prepolymer was obtained in the same manner as in Example 1, except that, while referring to patent document 1, IPDI was replaced with MDI, T-3500-80 and D-2000-80 were used as polyols in the amounts shown in Table 2, and the isocyanate index was changed to the value shown in Table 2.

Comparative Example 3

An isocyanate-group-containing prepolymer was obtained in the same manner as in Example 1, except that IPDI was replaced with MDI, T-3500-80 was used as a polyol in the amount shown in Table 2, and the isocyanate index was changed to the value shown in Table 2, as in the Example 3 given in patent document 3.

Comparative Example 4

An isocyanate-group-containing prepolymer was obtained in the same manner as in Example 1, except that the mixing ratio of T-1000-100 to T-3500-80 and the isocyanate index were changed to the values shown in Table 2.

The isocyanate group contents (% by mass) of the isocyanate-group-containing prepolymers obtained in the Examples and Comparative Examples were determined in accordance with JIS K 7301. Furthermore, the viscosities (mPa·s) at 25° C. of the isocyanate-group-containing prepolymers were measured with viscometer Type RE80, manufactured by Toki Sangyo Co., Ltd., in accordance with JIS K 1603. The results are shown in Table 1 and Table 2.

(Film Production)

The isocyanate-group-containing prepolymers of Examples 1 to 5 and Comparative Examples 1 to 4 were cured with moisture to obtain molded sheets. In the case of the Examples 1 to 5 and Comparative Example 4, in which IPDI had been used as the isocyanate compound, 2,2'-dimorpholinodiethyl ether was added in an amount of 0.5% by mass in order to accelerate the moisture-curing reaction. Each isocyanate-group-containing prepolymer was applied onto a biaxially oriented polypropylene film and then allowed to stand for 5 days in a 20° C. atmosphere having a relative humidity of 60% to obtain a film having a thickness of 50 μm. Furthermore, films having a thickness of 100 μm were obtained in the same manner. For the evaluations other than moisture permeability evaluation, the films having a thickness of 100 μm were used. With respect to moisture permeability, the films having a thickness of 100 μm were used for comparing the Examples and Comparative Examples. With respect to part of the Examples and Comparative Examples, the films having a thickness of 50 μm also were examined for moisture permeability; that film thickness is close to practical use.

The results of the following evaluations for Examples 1 to 5 and those for Comparative Examples 1 to 4 are shown in Table 1 and Table 2, respectively.

(Evaluations)

(1) Tensile Properties:

The elongation (%), tensile strength (MPa), and 100% modulus M100 (MPa) of each film were determined in accordance with JIS K 7311.

(2) Moisture Permeability:

Moisture permeability (g/m$^2$·24 hr) was measured by method B-2 as provided for in JIS L 1099.

The measured value of moisture permeability was converted to moisture permeability per 24 hours.

(3) Degree of Swelling with Water (Laundering Durability):

A disk having a diameter of 35 mm was cut out of each film, immersed in 23° C. water for 72 hours, and then examined for mass. The degree of swelling with water was calculated using the following equation.

Degree of swelling with water (%)={[(mass after immersion in water)−(mass before immersion in water)]/(mass before immersion in water)}×100

(4) Degree of Swelling with Oleic Acid (Resistance to Sweat Deterioration):

A disk having a diameter of 35 mm was cut out of each film, immersed in 80° C. oleic acid for 150 hours, and then examined for mass. The degree of swelling with oleic acid was calculated using the following equation.

Degree of swelling with oleic acid (%)={[(mass after immersion in oleic acid)−(mass before immersion in oleic acid)]/(mass before immersion in oleic acid)}×100

(5) Light Resistance (Yellowing Resistance):

Light resistance was examined through 14-hour light irradiation at 63° C. in an atmosphere having a relative humidity of 50%, in accordance with JIS L 0843. The degree of yellowing was judged in five ratings ranging from 1 (poor) to 5 (good).

(6) $NO_x$ Resistance (Yellowing Resistance):

$NO_x$ resistance was examined by the severe-test method as provided for in JIS L 0855. The degree of yellowing was judged in five ratings ranging from 1 (poor) to 5 (good).

TABLE 1

| Formulation (parts) | Example | | | | |
|---|---|---|---|---|---|
| | 1 | 2 | 3 | 4 | 5 |
| Isocyanate compound | | | | | |
| IPDI | 372.3 | 317.6 | 306.2 | 396.7 | 296.8 |
| MDI | — | — | — | — | — |
| Polyol | | | | | |
| T-1000-100 | 306.4 | 203.4 | 366.2 | 603.3 | 237.8 |
| T-3500-80 | 321.3 | 478.9 | 327.6 | — | — |
| D-2000-80 | — | — | — | — | — |
| D-1000-100 | — | — | — | — | 465.5 |
| Polyol | | | | | |
| Arithmetic-average molecular weight | 1600 | 2000 | 1500 | 1000 | 1000 |
| Oxyethylene group content (mass %) | 90 | 86 | 90 | 100 | 100 |
| Average number of hydroxyl groups | 3 | 3 | 3 | 3 | 2.3 |
| Isocyanate index | 285 | 285 | 200 | 200 | 163 |
| Isocyanate group content (mass %) | 8.7 | 7.2 | 5.1 | 7.2 | 3.9 |
| Viscosity (mPa·s)(25° C.) | 7900 | 12800 | 35800 | 42000 | 52300 |
| Tensile properties | | | | | |
| Elongation (%) | 260 | 250 | 200 | 220 | 260 |
| M100 (MPa) | 4.8 | 4.2 | 3.0 | 4.2 | 2.7 |
| Tensile strength (MPa) | 20.0 | 11.0 | 5.4 | 20.5 | 5.9 |
| Moisture permeability (g/m² · 24 hr) | | | | | |
| 50 μm | 10600 | — | — | 8100 | — |
| 100 μm | 6300 | 7200 | 10900 | 4700 | 8100 |
| Degree of swelling with water (%) | 30 | 74 | 70 | 25 | 77 |
| Degree of swelling with oleic acid (%) | 95 | 104 | 92 | 64 | 91 |
| Light resistance (rating) | 4-5 | 4-5 | 4-5 | 4-5 | 4-5 |
| $NO_x$ resistance (rating) | 4 | 4 | 4 | 4 | 4 |

TABLE 2

| Formulation (parts) | Comparative Example | | | |
|---|---|---|---|---|
| | 1 | 2 | 3 | 4 |
| Isocyanate compound | | | | |
| IPDI | — | — | — | 275.5 |
| MDI | 414.8 | 218.0 | 268.4 | — |
| Polyol | | | | |
| T-1000-100 | 308.8 | — | — | 120.0 |
| T-3500-80 | 276.4 | 469.2 | 731.6 | 600.5 |
| D-2000-80 | — | 312.9 | — | — |
| D-1000-100 | — | — | — | — |
| Polyol | | | | |
| Arithmetic-average molecular weight | 1500 | 2800 | 3500 | 2500 |
| Oxyethylene group content (mass %) | 90 | 80 | 80 | 83 |
| Average number of hydroxyl groups | 3 | 2.5 | 3 | 3 |
| Isocyanate index | 285 | 250 | 350 | 285 |
| Isocyanate group content (mass %) | 8.4 | 4.0 | 6.2 | 6.2 |
| Viscosity (mPa·s)(25° C.) | 43000 | 28300 | 15500 | 10000 |
| Tensile properties | | | | |
| Elongation (%) | 160 | 130 | 110 | 240 |
| M100 (MPa) | 4.2 | 2.1 | 3.9 | 4.2 |
| Tensile strength (MPa) | 7.3 | 2.3 | 5.9 | 7.5 |
| Moisture permeability (g/m² · 24 hr) | | | | |
| 50 μm | — | 13200 | 8100 | — |
| 100 μm | 1800 | 7700 | 4700 | 7800 |
| Degree of swelling with water (%) | 15 | 80 | 41 | 76 |
| Degree of swelling with oleic acid (%) | 9 | 104 | 67 | 120 |
| Light resistance (rating) | 2-3 | 2-3 | 2-3 | 4-5 |
| $NO_x$ resistance (rating) | 2-3 | 2-3 | 2-3 | 4 |

As shown in Table 1, Examples 1 to 5 were satisfactory in all of moisture permeability, tensile properties, degree of swelling with water, degree of swelling with oleic acid, light resistance, and $NO_x$ resistance. In contrast, it can be seen from Table 2 that Comparative Example 1, in which MDI had been used in place of the isocyanate compound used in Example 1, had exceedingly poor moisture permeability and was poor also in light resistance and $NO_x$ resistance. Furthermore, it can be seen that Comparative Example 2 and Comparative Example 3, which correspond to the coating agent compositions described in patent document 1 and patent document 3, are poor in light resistance and $NO_x$ resistance although they satisfy moisture permeability, tensile properties, and degree of swelling with water. It is seen that Comparative Example 4 is poor in degree of swelling with oleic acid.

While the invention has been described in detail and with reference to specific embodiments thereof, it will be apparent to one skilled in the art that various changes and modifications can be made therein without departing from the spirit and scope thereof.

This application is based on Japanese Patent Application No. 2005-6196 filed on Jan. 13, 2005, the contents thereof being herein incorporated by reference.

INDUSTRIAL APPLICABILITY

The coating agent composition of the invention can form a coating film or film which has excellent mechanical properties while retaining sufficient moisture permeability, has laundering durability and resistance to sweat deterioration, has excellent yellowing resistance, and contains no organotin compounds. It is exceedingly useful as a moisture-permeable coating not only for sports garments but for tents, industrial materials, etc.

The invention claimed is:

1. A process of making a coated substrate, comprising: coating a substrate with a coating composition comprising
   at least one isocyanate-group-containing prepolymer obtained by reacting
   (a) a polyoxyalkylene polyol, with
   (b) at least one isocyanate compound comprising an alicyclic isocyanate, an aliphatic isocyanate, or a combination thereof in the presence of an organic acid bismuth salt catalyst,
   wherein
      said polyoxyalkylene polyol (a) comprises as a mixture:
         from 20% by mole to less than 100% by mole of a first polyoxyalkylene polyol having three hydroxyl groups and a hydroxyl-value-converted molecular weight of from 500 to less than 2,000, and
         from more than 0% by mole to 80% by mole of a second polyoxyalkylene polyol having three hydroxyl groups and a hydroxyl-value-converted molecular weight of from 2,000 to 5,000, where the percents by mole are relative to 100% by mole of the mixture,
      the isocyanate compound is present during said reacting in such an amount as to result in an isocyanate index of 150-300, and
      said polyoxyalkylene polyol (a) has an oxyethylene group content of 85-100% by mass based on all oxyalkylene groups thereof (100% by mass); and
   curing said coating composition.

2. The process of claim 1, wherein either of said first and second polyoxyalkylene polyol comprises a polyoxyethylene polyol, a polyoxyethylene-polyoxypropylene polyol, or a combination thereof.

3. The process of claim 1, wherein said isocyanate compound comprises isophorone diisocyanate.

4. The process of claim 1, wherein said organic acid bismuth salt catalyst comprises a bismuth salt of an aliphatic carboxylic acid having 6-20 carbon atoms.

5. The process of claim 4, wherein the organic acid bismuth salt catalyst comprises at least one member selected from the group consisting of a bismuth salt of octylic acid, a bismuth salt of neodecanoic acid, and a bismuth salt of neododecanoic acid.

6. The process of claim 1, wherein the organic acid bismuth salt catalyst is present in an amount of 5-100 ppm relative to the total amount of all polyols and the isocyanate compound during said reacting.

7. An article having a coating film obtained from the process of claim 1.

8. A film obtained from the process of claim 1.

9. The process of claim 1, wherein said reacting occurs at a temperature from 40 to 150° C.

10. The process of claim 1, wherein said alicyclic isocyanate compound comprises at least one member selected from the group consisting of isophorone diisocyanate, 4,4'-dicyclohexylmethane diisocyanate, 2,5-norbornane diisocyanate, 2,6-norbornane diisocyanate, and a mixture of 2,5-norbornane diisocyanate and 2,6-norbornane diisocyanate.

11. The process of claim 1, wherein said aliphatic isocyanate compound comprises at least one member selected from the group consisting of 1,6-hexamethylene diisocyanate, 2,2,4-trimethylhexamethylene diisocyanate, lysine diisocyanate, and lysine triisocyanate.

12. The process of claim 1, wherein said polyoxyalkylene polyol (a) consists of from 20% by mole to less than 100% by mole of said first polyoxyalkylene polyol (having three hydroxyl groups and a hydroxyl-value-converted molecular weight of from 500 to less than 2,000), and
   from more than 0% by mole to 80% by mole of said second polyoxyalkylene polyol (having three hydroxyl groups and a hydroxyl-value-converted molecular weight of from 2,000 to 5,000).

13. The method according to claim 1, wherein said contacting occurs at a temperature of 20° C. for a period of five days and at a relative humidity of 60%.

14. The process of claim 1, wherein said polyoxyalkylene polyol (a) comprises:
   from 50% by mole to 90% by mole of said first polyoxyalkylene polyol (having three hydroxyl groups and a hydroxyl-value-converted molecular weight of from 500 to less than 2,000), and
   from 10% by mole to 50% by mole of said second polyoxyalkylene polyol (having three hydroxyl groups and a hydroxyl-value-converted molecular weight of from 2,000 to 5,000).

15. The process according to claim 1, wherein said at least one isocyanate compound comprises 2,5-norbornane diisocyanate; 2,6-norbornane diisocyanate; a mixture of 2,5-norbornane diisocyanate and 2,6-norbornane diisocyanate; 1,6-hexamethylene diisocyanate; 2,2,4-trimethyhexamethylene diisocyanate; lysine diisocyanate and lysine triisocyanate.

16. The process of claim 1, wherein said alicyclic isocyanate compound comprises at least one member selected from the group consisting of 4,4'-dicyclohexylmethane diisocyanate, 2,5-norbornane diisocyanate, 2,6-norbornane diisocyanate, and a mixture of 2,5-norbornane diisocyanate and 2,6-norbornane diisocyanate.

17. The process of claim 1, wherein said curing comprises contacting said coating composition with moisture, thereby curing said coating composition.

18. The process of claim 17, further comprising stripping the cured composition from the substrate.

19. The process of claim 1, wherein said curing comprises contacting said coating composition with a polyamine vapor, thereby curing said coating composition.

20. The process of claim 19, further comprising stripping the cured composition from the substrate.

* * * * *